Aug. 21, 1962
R. B. OLNEY
3,050,447
VAPOR-LIQUID CONTACTING PROCESS USING PRESSURE PULSATIONS
Filed Jan. 10, 1955
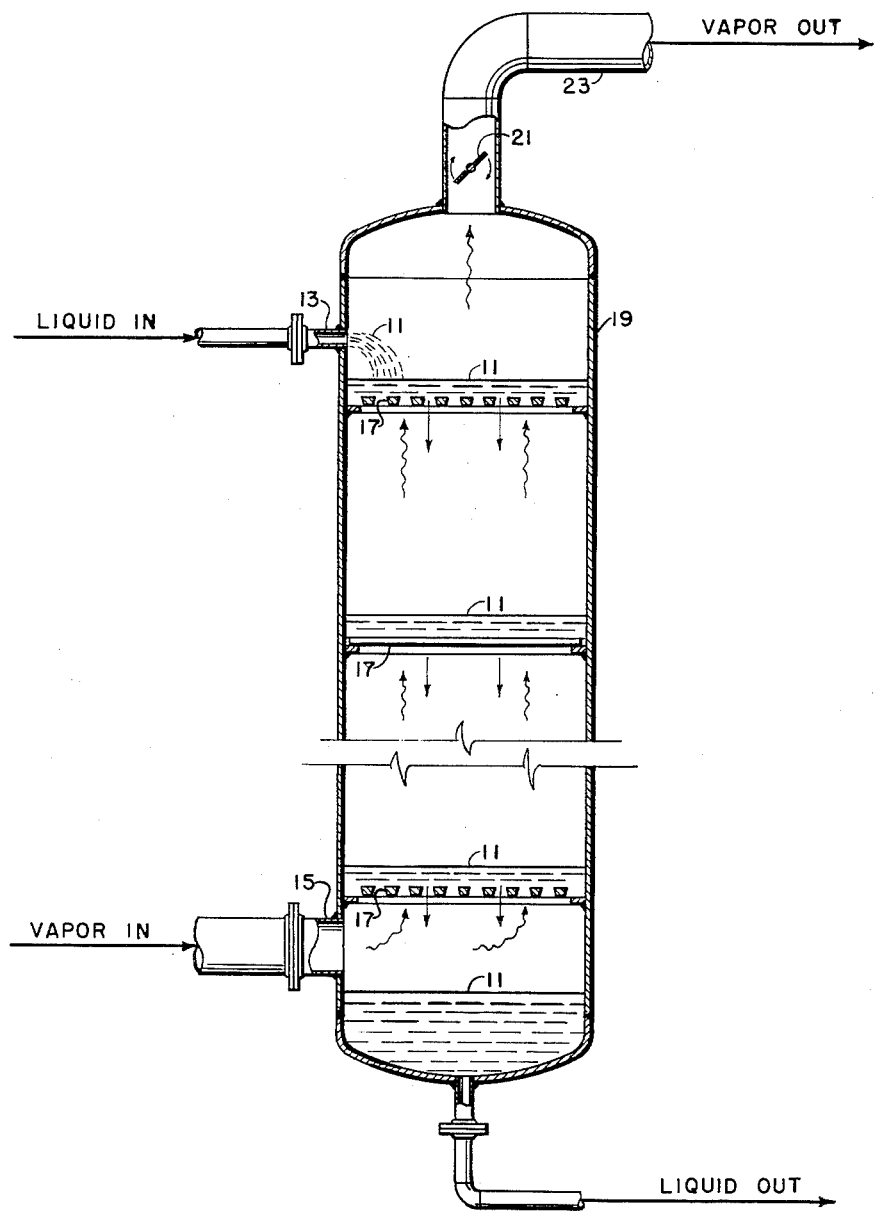
INVENTOR:
RICHARD B. OLNEY
BY James Todorovic
HIS ATTORNEY

United States Patent Office 3,050,447
Patented Aug. 21, 1962

3,050,447
VAPOR-LIQUID CONTACTING PROCESS USING PRESSURE PULSATIONS
Richard B. Olney, Berkeley, Calif., assignor to Shell Oil Company, a corporation of Delaware
Filed Jan. 10, 1955, Ser. No. 480,982
7 Claims. (Cl. 202—39)

The present invention relates to improved vapor-liquid contacting and diffusional processes, and especially to separation processes such as distillation, adsorption, stripping and the like.

Vapor-liquid diffusional processes are characterized in that a mass transfer takes place in such processes either or both from a vapor phase to a liquid phase or from a liquid phase to a vapor phase. Many of such processes, particularly as applied to separations of mixtures, involve successive and discrete steps of contact and disengagement of the vapor and liquid phases in a contacting vessel. The efficiency of these processes depends upon the degree to which an equilibrium is approached during the contact of the vapor and liquid. Thus, in ordinary fractional distillation, stripping or absorption in a vertically spaced tray column, each tray is designed to provide contact between, and then disengagement of, an upwardly flowing vapor and a downwardly flowing liquid. A closer approach to equilibrium between the liquid and vapor on each tray makes possible the attainment of a required separation of a mixture with fewer actual trays. This, of course, means that the separation can be effected in a smaller and less expensive column. Furthermore, any method of facilitating the approach to equilibrium in each step will make possible the attainment of a more complete separation of a given feed mixture in equipment of fixed design and size.

It is accordingly a principal object of the present invention to provide an improved vapor-liquid contacting process. A more particular object is to provide a method of increasing the efficiency of separation processes involving vapor-liquid contacting in which mass transfer takes place between the phases. Another object is to provide a method by which a closer approach to equilibrium is attained in discrete vapor-liquid contacting and disengaging steps. Another object is to increase the efficiency of all such steps in a successive stepwise vapor-liquid contacting process, particularly such counter-current processes. Another object is to increase the efficiency of such processes without change of mechanical design. Further objects will become apparent in the description of the invention, which will be made with reference to the accompanying drawing, in which the sole FIGURE is a representation of an embodiment of the invention in which means is provided to impose forced pressure pulsations upon a countercurrent vapor-liquid contacting zone containing a plurality of discrete contacting and disengaging steps.

It has now been discovered that the objects of the invention can be accomplished by means of controlled, forced pressure pulsations in the vapor-liquid system within particular ranges of certain variables. When such pressure pulsations are imposed according to the present invention, the desired mass transfer between the phases is facilitated and a closer approach to equilibrium is attained.

A most convenient way by which suitable pulsations can be imposed upon the system is by means of a rotating damper in the vapor inlet or especially the vapor outlet of the contacting equipment, for example in the vapor outlet of a distillation column, between the column and the overhead condenser. Another way is by means of a reciprocating diaphragm or a movable piston which will periodically change the internal volume of the equipment. However, the particular means by which pulsations are imposed and controlled is not critical to the invention as long as the hereinafter-described limitations are met. Many of such means will suggest themselves to those skilled in the processing and mechanical arts, and can be used without departing from the essence of the invention.

The process limitations defined hereinafter have been discovered to be essential to the attainment of the benefits of the invention. The dynamic interrelationships of the system must be such as to avoid, in the first place, an excessive damping of the pulsations from one contacting step to the next, and in the second place, an excessive resonance within the system, which would upset pressure and temperature controls, or interfere with the operation of a reboiler, or result in entrainment between successive contacting stages such as to reduce the over-all contacting efficiency of the process. These limitations are most conveniently understood by resort to a dynamic analogy between the process of the invention and an electrical circuit. Such analogies have long been applied to facilitate calculations of acoustical systems, that is, those systems wherein wave disturbances (e.g., sound) are propagated through a gaseous medium (e.g., air). This calculation technique has not been perfected for systems which involve interaction between two phases, such as the liquid-vapor systems with which the present invention is concerned, but the analogy can serve in the understanding of the reasons for the quantitative limitations experimentally determined to be essential to the present invention.

The drawing is a simplified and exemplary representation of one vapor-liquid contacting process according to the invention in which a down-flowing liquid 11, introduced through line 13, is contacted with an upflowing vapor introduced through line 15 on horizontal trays 17 in a column 19. A rotating damper 21 periodically restricts the flow of vapor through the vapor outlet 23, thus providing forced pressure fluctuations of an approximately sinusoidal wave pattern within the column.

For a more ready understanding of the characteristics of the system, a corresponding electrical system can be visualized, wherein an alternating current generator takes the place of the rotating damper 21 and imposes a sinusoidal alternating electromotive force upon a circuit containing shunt capacitors, representing the vapor spaces within the column (which spaces have the ability to hold or store pressure fluctuations), and also containing series resistances and inductances between the various capacitors, the resistances representing the opposition of the trays (and the liquid on them) to the fluctuating relative flow of vapor, and the inductances representing the inertia of the liquid, in and about the vapor passages of the trays, which is set in reciprocating relative motion by the reciprocating relative flow of the vapor. Each loop of the electrical circuit is thus analogous to one vapor space and the tray, if any, above it.

The flow of electric current in the circuit will be analogous to the instantaneous flow of vapor in the drawing relative to the steady state over-all flow of vapor through the column. Of course, it would be possible to impose a direct current upon the electrical circuit to represent the steady state over-all flow of vapor through column 19 of the drawing, but the characteristics of the system important to this analysis can be more easily, and just as validly visualized without it.

The dynamics of forced pulsations in vapor-liquid systems is also essentially independent of the steady state over-all flows of liquid and vapor, except as they affect the elements of the system which are equivalent to capacitance, inductance and resistance. Thus, the analogy will hold for systems in which any combination of over-all flow routes of liquid and vapor are encountered, for example distillation processes where liquid and/or vapor feed is introduced near the middle of the column, absorption processes, stripping processes, and the like.

The amplitude of the current at any point in an electrical circuit such as that described above may either decrease (attenuate), increase (become amplified) or remain the same, as the distance from the generator is increased. This depends upon whether there is a damping effect, a resonating effect or neither, and the occurrence of such phenomena, in turn, depends upon the particular values of the capacitances, resistances, and inductances, as is well known in the electrical circuit art.

It has now been discovered that a similar effect exists in the case of the imposition of forced pulsations upon a vapor-liquid system.

The various analogous resistances, inductances and capacitances in a discrete step vapor-liquid contacting system can be represented approximately by the following relationships:

R, the resistance of a discrete contacting step, $$\cong \frac{d\Delta p}{dQ}$$

where:

$\Delta p$ is the pressure drop across the discrete contacting step (for example, a tray); and
$Q$ is the vapor volume flow through the contacting zone, volume of vapor per unit time.

L, the inductance of a discrete contacting step, $$\cong \frac{\rho_l H}{g_c A_i}$$

where:

$\rho_l$ is the density of the liquid in the system;
H is the liquid hold-up in the discrete contacting step, volume of liquid per unit area of the contacting step cross section;
$g_c$ is the acceleration due to gravity; and $A_i$ is the interfacial area between liquid and vapor phases in a discrete contacting zone.

C, the capacitances, $$\cong \frac{V}{P_a}$$

where:

V is the vapor volume between the discrete contacting step and a next adjacent contacting step (for example, the next higher tray in a vapor-liquid contacting column); and
$P_a$ is the average absolute pressure in the volume represented by V. An assumption here is that the compression due to the pressure pulsations is isothermal.

In the practical case of operating a process according to the invention, some of the above variables are independent and some dependent. Also, as before mentioned, it is not possible to precisely calculate the acoustical characteristics of the system by means of this analogy, because it is probably somewhat oversimplified. However, it has been found by experimentation that the objects of the invention can be realized when the process is carried out within the limits set forth hereinafter, regardless of the precise accuracy of the above-mentioned relationships.

The liquid loading during the process, that is, the volume flow of liquid per unit area of cross section available for vapor and liquid flow, for example the internal cross sectional area of a distillation, absorption or stripping column, must be from about 0.2 to about 15 gallons per minute per square foot, preferably at least 1 g.p.m./sq. ft., and, for best results, not more than about 5 g.p.m./sq. ft.

$\Delta p$, the pressure drop per discrete contacting step, must be a finite value of no more than 6 inches of water, and preferably no more than 4 inches of water. It will be noted that this variable is fixed by the geometry of the contacting step together with the vapor and liquid properties and flows, according to relationships well known in the art.

H, the liquid hold-up, as defined above, must be a finite value no more than 6 inches, and, for best results, no more than 4 inches. This variable, too, depends upon the design of the contacting step and also upon vapor and liquid properties and flows according to relationships well known in the art.

The linear spacing between contacting steps (for example, the tray spacing) must be at least 3 inches, and preferably at least 6 inches, but should not be more than 36 inches and preferably no more than 24 inches.

The vapor flow rate must also be fixed in relation to the vapor flow rate as limited by flooding in the particular contacting equipment. For the sake of simplicity, this can be designated as the vapor loading, and is defined as the ratio of Q, as defined above, to $Q_f$, the volume of vapor passing through the contacting zone per unit time at the onset of flooding, that is, the vapor flow rate at the operating liquid flow rate beyond which any further increase in vapor flow would decrease the net downward flow of liquid from one contacting step to the next lower contacting step. Thus, $Q/Q_f$ must be from 0.2 to 1.0, and preferably at least 0.5.

As indicated in the above discussion of the acoustical analogy relationships, the density of the liquid is an important variable with respect to the inductances. Similarly, the resistance term, which is the rate of change of pressure drop per contacting step with change in vapor flow depends upon not only the value of $\Delta p$ at the operating vapor and liquid flows, as limited above, but also upon the vapor and liquid densities, the surface tension of the vapor-liquid interface and the viscosity of the liquid (all at the operating temperatures and pressures of the system). For the present purpose, the vapor density must be from about 0.001 to about 3.0 pounds per cubic foot; the liquid density must be from 20 to 90 pounds per cubic foot and preferably at least 30 and no more than 60 pounds per cubic foot; the surface tension must be from about 5 to about 70 dynes per centimeter; and the liquid viscosity must be from about 0.05 to about 5 centipoises. The values of these variables in a particular system will, of course, in turn depend upon the molecular weights and chemical character of the liquid and vapor as well as upon the system pressure. The former variables are limited here, rather than the molecular weights, chemical characteristics and system pressure, because the latter have no significance in the present process except as they determine the former. Also, the densities, surface tension and viscosity are either well known or are easily determined for any given system.

The above variables may be considered as the steady state variables, and the limitations thereof are to be measured under steady state conditions. The further variables which must be limited to attain the advantages of the present invention are those concerning the pressure pulsations themselves, namely, the frequency and amplitude of the pulsations. Thus, the frequency of the pulsations must be at least 0.1 cycle per second or preferably at least 1 cycle per second. Additionally, the frequency must be no more than 50 cycles per second, and even better results are obtained when it is no more than 15 cycles per second. The amplitude of the pulsations at the source must be at least 0.1 inch of water and preferably at least 0.3 inch of water. On the other hand, the amplitude must be no more than 15 inches of water and, for best results, no more than 10 inches of water.

As long as the process variables are limited as above, the invention is useful and advantageous in many different types of vapor-liquid contacting techniques. For example, the contacting can be by means of bubble cap trays, perforated plate trays, "cascade-type" trays, grid trays and the many variations of these. Each of these types has its own peculiar advantages and disadvantages as regularly used. For example, a given bubble cap tray is efficient over relatively wide ranges of vapor and liquid loadings, but is complicated and expensive to fabricate. On the other hand, the perforated plate tray and the grid tray are simpler and less expensive, and the latter, especially, has a higher capacity, lower pressure drop and lower liquid hold-up than does the bubble cap tray. But these latter types generally maintain their efficiency over somewhat narrower ranges of vapor and liquid loadings.

Accordingly, it is a particularly advantageous and preferred application of the present invention to employ the forced pressure fluctuations in connection with a vapor-liquid contacting process in a grid tray column, because all of the advantages of the grid trays are retained by means of this technique, while, at the same time, the efficient operating range is considerably extended, thus imparting a much greater flexibility in the operation of such a column.

The advantages of the present invention were proved experimentally in a number of full-scale tray tests. The column used was one with a 9 square foot internal cross sectional area (3 ft. by 3 ft.). It contained a liquid reservoir, with a liquid outlet, in the bottom of the column, two grid trays spaced at 18 inches, and, above the grid trays, a liquid distributor tray with vapor risers extending therefrom upwardly into an entrainment collector tray. Above the entrainment tray, at the top of the column, was a 4 inch-thick wire mesh de-entrainment mat. A 14 inch diameter vapor stack provided a vapor outlet from the top of the column to the atmosphere. Dampers of varying size (in order to provide pulsations of widely varying amplitude) were installed in this vapor stack and rotated by means of a variable speed drive. Dampers with, for example, diameters of 12.13 and 10.19 inches were found to be suitable. Frequency was varied by varying the speed of rotation of the damper.

The tray efficiency measurements were based upon atmospheric temperature stripping of acetone from an acetone-water solution by means of air. Air was supplied to the system at a measured rate from a blower and entered the column at a point beneath the bottom tray. An acetone-water solution containing 0.005 mol percent acetone was metered into the column on the liquid distributor tray. Tray efficiencies were calculated in the conventional manner from the flow rates and analyses of the column bottoms product for acetone.

Runs were made with a number of different tray layouts, some with the conventional flat bar type of grid tray and others with the stamped, slotted type of grid tray. Three of these layouts were as follows:

| Tray Type | Percent Free Area | Slot Dimensions, Inches | Tray Thickness |
|---|---|---|---|
| Stamped | 13.4 | ¼ x 7 | 20 gage. |
| Stamped | 26.8 | ¼ x 7 | 20 gage. |
| Flat Bars | 36.4 | ¼ x 15½ | ¼ inch. |

Pressure pulsation characteristics were measured by means of strain gage pickups inserted in the vapor spaces of the column. The strain gages were coupled through a multi-channel amplifier to a pen-type recorder. Traces for each run were analyzed to determine pulsation amplitudes, frequencies and phase lags.

It was found in these tests that within the process limitations specified herein, the imposition of forced pulsations resulted in increased tray efficiencies of from 4 to over 30 percent. An especially large increase in efficiency was obtained in these tests, for example, when the pulsation frequency $F$=cycles/sec., vapor flow rate $Q$=cu. ft./sec., and liquid flow rate $N'$=cu. ft./sec., had values such that $$F\left(\frac{Q}{N'}\right) > 10,000 \text{ sec.}^{-1}$$

It was also found that within these same ranges of process variables pulsation attenuation was minimized and pulsation amplification was in no case so great as to suppress the increase in tray efficiency obtained or to cause other processing difficulties.

When applied to a hydrocarbon distillation process or the like, wherein larger quantities of volatile material are repeatedly vaporized and condensed, the forced pulsations of the present invention will result in even greater increases in tray efficiency.

The process is particularly advantageous in the usual vacuum distillation process, such as employed in the separation of lubricating oil or residual fractions from crude petroleum. Such processes ordinarily involve the relatively low liquid loadings with which the present process effects a particularly large increase in efficiency. However, it is also applicable and advantageous in distillation and other vapor-liquid contacting process carried out at atmospheric pressures or elevated pressures, for example, up to 200 to 400 pounds per square inch.

Table I contains data from a few representative runs. The data in Table I illustrate the criticality of the process limitations specified herein. For example, it will be noted that the increases in tray efficiency were high when the liquid loading was 1.1 gallons per minute per square foot of column cross sectional area. A benefit, though smaller, was obtained at 11 g.p.m./sq. ft., which is within the operable range but above the preferred maximum. However, at 33 g.p.m./sq. ft. not only did the pulsations fail to provide a benefit, but, moreover, they resulted in a serious loss of efficiency.

Table 1

| Percent Free Area of Trays | Liquid Rate | | Air Rate | | Pulsation Frequency Cycles, Sec. | Pulsation Amplitude Above Top Tray, In. H$_2$O | $\Delta p$, per Tray, in. H$_2$O | H, Inches | Vapor Space | |
|---|---|---|---|---|---|---|---|---|---|---|
| | g.p.m. | g.p.m., ft.$^2$ | c.f.m. | Percent of Flood Pt. | | | | | Tray Spacing T, inches | Vol. Between Trays V, ft.$^3$ |
| 26.8 | 10 | 1.1 | 3,900 | 74.3 | 2.43 | 6.59 | 0.40 | .40 | 18 | 13.5 |
| 26.8 | 10 | 1.1 | 3,880 | 73.9 | 7.20 | 2.27 | .42 | .38 | 18 | 13.5 |
| 36.4 | 10 | 1.1 | 4,370 | 80.9 | 2.00 | 8.07 | .30 | .25 | 18 | 13.5 |
| 36.4 | 10 | 1.1 | 4,400 | 81.5 | 6.93 | 2.22 | .34 | .27 | 18 | 13.5 |
| 26.8 | 100 | 11 | 3,500 | 82.3 | 1.08 | 6.94 | .92 | .85 | 18 | 13.5 |
| 36.4 | 300 | 33 | 2,870 | 65.2 | 0.90 | 5.07 | .82 | .72 | 18 | 13.5 |

| Properties of Vapor and Liquid at Column Condition | | | | Percent Tray Efficiency | | |
|---|---|---|---|---|---|---|
| Density of Air #/ft.$^3$ | Density of Acetone Solution, #/ft.$^3$ | Surface Tension, Dynes/cm. | Solution Viscosity, cp. | (A) No Pulsations | (B) Pulsation | Ratio (B)/(A) |
| 0.076 | 62 | 60-70 | 1 | 29.5 | 36.7 | 1.24 |
| 0.076 | 62 | 60-70 | 1 | 29.4 | 37.1 | 1.26 |
| 0.076 | 62 | 60-70 | 1 | 21.7 | 27.9 | 1.28 |
| 0.076 | 62 | 60-70 | 1 | 21.9 | 28.6 | 1.31 |
| 0.076 | 62 | 60-70 | 1 | 29.0 | 30.7 | 1.06 |
| 0.076 | 62 | 60-70 | 1 | 33.6 | 30.1 | 0.90 |

I claim as my invention:

1. A process of contacting within a contacting zone an upwardly flowing vapor with a downwardly flowing liquid in a plurality of discrete contacting and disengaging steps vertically spaced at a distance of from about 6 to about 24 inches, inclusive, in which process mass is transferred between liquid and vapor phases, and wherein the liquid flow rate is from about 0.2 to about 5 gallons per minute per square foot of horizontal cross sectional area of said contacting zone, the vapor loading is from about 0.2 to 1.0, the pressure drop per contacting step is no more than 6 inches of water, the liquid hold-up in each contacting step is no more than 6 cubic inches per square inch of horizontal cross sectional area of said contacting step, the vapor density is from about 0.001 to about 3.0 pounds per cubic foot, the liquid density is from 20 to 90 pounds per cubic foot, the liquid viscosity is from about 0.05 to about 5 centipoises, and the liquid surface tension is from about 5 to about 70 dynes per centimeter, and facilitating a closer approach to equilibrium between the vapor and liquid in said steps by imposing forced pressure pulsations within said contacting zone, the frequency of said pulsations being from about 0.1 to about 15 cycles per second and the amplitude of said pulsations being equivalent to from about 0.1 to about 15 inches of water.

2. The process of claim 1 wherein the pulsation frequency, in cycles per second, multiplied by the vapor flow rate, in cubic feet per second, and divided by the liquid flow rate, in cubic feet per second, is greater than 10,000 reciprocal seconds.

3. The process of claim 1, wherein the liquid flow rate is from about 1 to about 5 gallons per minute per square foot of horizontal cross sectional area of the contacting zone.

4. The process of claim 3, wherein the frequency of the pulsations is from about 1 to about 15 cycles per second.

5. The process of claim 4 wherein the contacting process is a distillation process carried out at less than atmospheric pressure.

6. In the fractional distillation of liquids by boiling them and passing the resulting vapors upwardly against the returning reflux the part of the said vapors condensed to liquid form in a distillation space, the process which comprises alternately increasing and decreasing the volume of said space by from 0.3% to 3% of the total volume at a frequency of approximately 20 cycles per second.

7. In the fractional distillation of liquids by boiling them and passing the resulting vapors upwardly against the returning reflux of the part of the said vapors condensed to liquid form in a distillation space, the process which comprises alternately increasing and decreasing the pressure on the vapors in said space by from 0.3% to 3% at a frequency of approximately from 2 to 30 cycles per second.

References Cited in the file of this patent

UNITED STATES PATENTS

| 620,595 | Lippett | May 7, 1899 |
| 720,336 | Ede | Feb. 10, 1903 |
| 1,755,614 | Seil | Apr. 22, 1930 |
| 1,849,146 | Kraut | Mar. 15, 1932 |
| 2,265,762 | McKittrick et al. | Dec. 9, 1941 |
| 2,693,350 | Ragatz | Nov. 2, 1954 |

FOREIGN PATENTS

| 126,891 | Great Britain | May 22, 1919 |
| 885,548 | France | May 31, 1943 |